(12) United States Patent
Reboa et al.

(10) Patent No.: US 6,917,456 B2
(45) Date of Patent: Jul. 12, 2005

(54) LIGHT MODULATOR

(75) Inventors: Paul F. Reboa, Corvallis, OR (US); Steven L Harper, Corvallis, OR (US); Antonio S. Cruz-Uribe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 79 days.

(21) Appl. No.: 10/731,070

(22) Filed: Dec. 9, 2003

(65) Prior Publication Data

US 2005/0122559 A1 Jun. 9, 2005

(51) Int. Cl.⁷ ............................. G02F 1/07; G02F 1/13
(52) U.S. Cl. ...................... 359/253; 359/252; 359/245; 349/201
(58) Field of Search ................................. 359/253, 252, 359/246, 245, 248, 247, 240, 238; 349/201, 34, 143, 139, 171, 184

(56) References Cited

U.S. PATENT DOCUMENTS

| | | | |
|---|---|---|---|
| 4,660,938 A | 4/1987 | Kazan .......................... 359/245 |
| 4,729,640 A | * 3/1988 | Sakata ......................... 349/201 |
| 4,836,657 A | 6/1989 | Gunji et al. ................. 349/196 |
| 5,156,452 A | * 10/1992 | Drzaic et al. ................. 349/86 |
| 5,477,351 A | 12/1995 | Takahara et al. ............... 349/5 |
| 5,486,940 A | * 1/1996 | Fergason et al. ............. 349/122 |
| 5,648,859 A | 7/1997 | Hirabayashi et al. .......... 349/9 |
| 5,694,189 A | 12/1997 | Nakamura et al. ........... 349/143 |
| 5,734,455 A | 3/1998 | Yoshida et al. ................ 349/99 |
| 5,745,281 A | 4/1998 | Yi et al. ........................ 359/290 |
| 5,841,496 A | 11/1998 | Itoh et al. .................... 349/113 |
| 6,052,165 A | 4/2000 | Janssen ........................ 349/84 |
| 6,072,553 A | 6/2000 | Mitsui et al. ................ 349/113 |
| 6,166,787 A | 12/2000 | Akins et al. ................... 349/57 |
| 6,278,508 B1 | 8/2001 | Ogawa et al. ............... 349/113 |
| 6,323,834 B1 | 11/2001 | Colgan et al. ................ 345/84 |
| 6,380,995 B1 | 4/2002 | Kim ........................... 349/113 |
| 6,473,492 B2 | 10/2002 | Prins et al. .................. 378/158 |
| 6,563,559 B2 | 5/2003 | Noritake ..................... 349/113 |
| 6,587,180 B2 | 7/2003 | Wang et al. ................. 349/202 |
| 6,621,540 B2 | 9/2003 | Noritake et al. ............ 349/113 |
| 2003/0016905 A1 * | 1/2003 | Kondoh et al. ................ 385/18 |

OTHER PUBLICATIONS

"Digital Microfluidics by Electrowetting", Duke University, Nov. 7, 2003, pp. 1–4.

Robert A. Hayes & B. J. Feenstra, "Video–Speed Electronic Paper Based on Electrowetting", Nature, vol. 25, Sep. 25, 2003, pp. 383–385.

"Liquid Crystal Used in Beam Steering Device", SPIE Web, OE Reports 180, Dec. 1998, 3 pgs.

"Philips Demonstrates Video–Speed Electronic–Paper Technology Based on Electrowetting", Royal Phillips Electronics Press Information, Sep. 25, 2003, 3 pgs.

Chappell Brown, "Electrowetting Touted for New Display Technology", EE Times, Sep. 26, 2003, 2 pgs.

* cited by examiner

Primary Examiner—Timothy Thompson

(57) ABSTRACT

A light modulator includes a substrate, a transparent plate spaced from the substrate such that the transparent plate and the substrate define a cavity therebetween, at least one electrode formed on the substrate adjacent the cavity, and a liquid having an index of refraction greater than one disposed within the cavity. An interface of the liquid is oriented at an angle to a surface of the at least one electrode and oriented at an angle to a surface of the transparent plate. As such, light is adapted to pass through and refract at the interface of the liquid.

53 Claims, 6 Drawing Sheets

LIGHT MODULATOR

BACKGROUND

Light modulators have been developed for amplitude and/or phase modulation of incident light. One application of a light modulator is in a display system. As such, multiple light modulators are arranged in an array such that each light modulator provides one or more cells or pixels of the display.

An example of a light modulator includes a micro-mirror device. The micro-mirror device includes an electrostatically actuated mirror supported for rotation about an axis of the mirror. As such, rotation of the mirror about the axis may be used to modulate incident light by directing or reflecting the incident light in different directions. For example, the micro-mirror device may be used to direct the incident light to a viewer or onto a display screen.

Mirrors of micro-mirror devices are fragile and complicated to manufacture. In addition, the mirrors have to withstand being moved through several thousand cycles per second. Thus, the mirrors are susceptible to stiction and/or complete failure.

Accordingly, it is desirable for a light modulator which modulates incident light without relying on moving mirrors.

SUMMARY

One aspect of the present invention provides a light modulator. The light modulator includes a substrate, a transparent plate spaced from the substrate such that the transparent plate and the substrate define a cavity therebetween, at least one electrode formed on the substrate adjacent the cavity, and a liquid having an index of refraction greater than one disposed within the cavity. An interface of the liquid is oriented at an angle to a surface of the at least one electrode and oriented at an angle to a surface of the transparent plate. As such, light is adapted to pass through and refract at the interface of the liquid.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
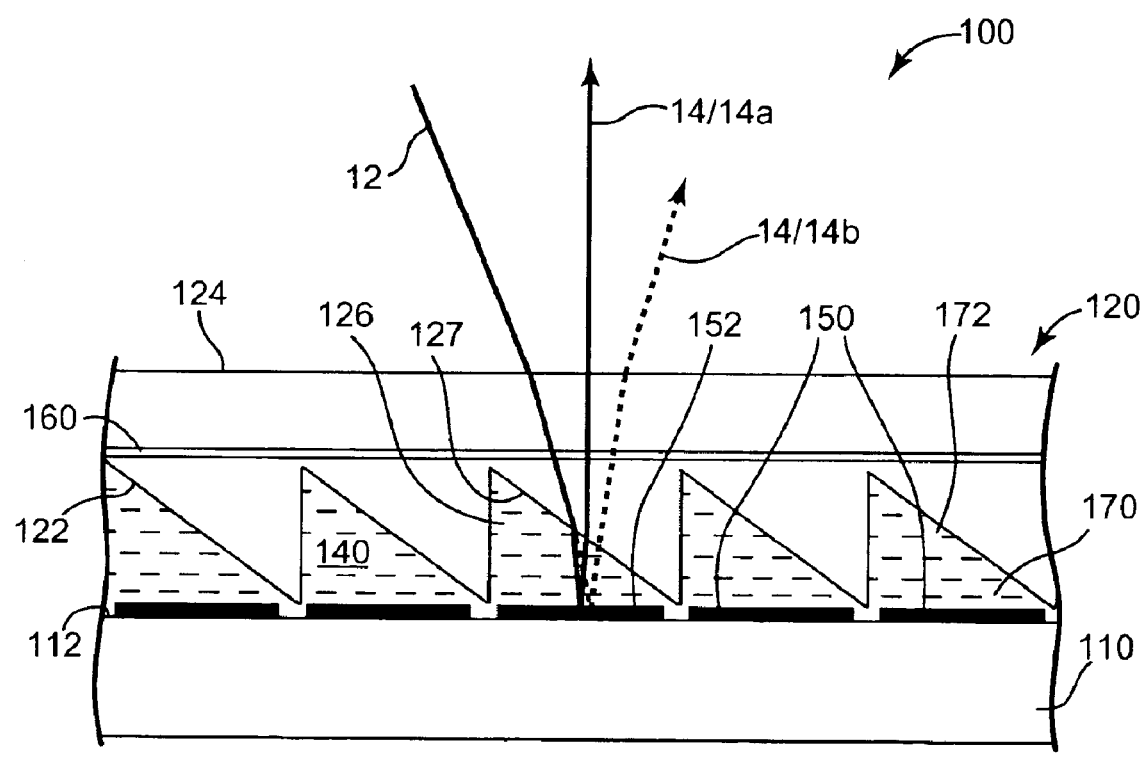
FIG. 1 is a schematic cross-sectional view illustrating one embodiment of a portion of a light modulator according to the present invention.

FIG. 1 illustrates one embodiment of a light modulator 100. Light modulator 100 relies on refractive properties of different materials to direct light in different directions. In one embodiment, as described below, a plurality of light modulators 100 are arranged to form an array of light modulators. As such, the array of light modulators may be used to form a display. Thus, the array of. light modulators modulate incident light and provide individual cells or pixels of the display. In addition, light modulator 100 may also be used in other imaging systems such as projectors or printers, and may also be used for optical addressing or switching, and/or other optical beam modification.

In one embodiment, light modulator 100 includes a substrate 110 and a transparent plate 120. In one embodiment, transparent plate 120 is oriented substantially parallel with substrate 110 and spaced from substrate 110 so as to define a cavity 140 therebetween. Substrate 110 has a surface 112 adjacent cavity 140 and transparent plate 120 has a surface 122 adjacent cavity 140. In addition, transparent plate 120 has a surface 124 opposite surface 122. In one embodiment, surface 112 of substrate 110 and surface 124 of transparent plate 120 are substantially planar and oriented substantially parallel with each other.

In one embodiment, substrate 110 is a silicon substrate and includes circuitry for light modulator 100. In one embodiment, transparent plate 120 is a glass plate. Other suitable substantially planar translucent or transparent materials, however, may be used. Examples of such materials includes quartz and plastic.

In one embodiment, electrodes 150 are formed on surface 112 of substrate 110 arid a transparent electrode 160 is formed within transparent plate 120. In one embodiment, each electrode 150 has a reflective surface 152 adjacent cavity 140. In one embodiment, the entire area of each reflective surface 152 is substantially planar. In addition, reflective surface 152 of each electrode 150 is oriented substantially parallel with surface 124 of transparent plate 120. As such, electrodes 150 reflect light through cavity 140 and transparent plate 120, including through transparent electrode 160, as described below.

As illustrated in the embodiment of FIG. 1, surface 122 of transparent plate 120 is an uneven surface. In one embodiment, for example, surface 122 of transparent plate 120 has a sawtooth profile and includes a plurality of recessed areas 126. In one embodiment, each recessed area 126 includes an angled surface 127. As such, angled surfaces 127 are oriented at an angle to reflective surfaces 152 of electrodes 150 formed on surface 112 of substrate 110 and oriented at an angle to surface 124 of transparent plate 120. In one exemplary embodiment, the angle of angled surfaces 127 relative to surface 112 of substrate 110 is in a range of approximately 15 degrees to approximately 45 degrees.

In one embodiment, each electrode 150 is positioned on surface 112 of substrate 110 so as to be associated with one recessed area 126 of surface 122 of transparent plate 120. It is, however, within the scope of the present invention for multiple electrodes 150 to be associated with one recessed area 126 and/or one electrode 150 to be associated with multiple recessed areas 126.

In one embodiment, cavity 140 is filled with a liquid 170. Liquid 170 is disposed within cavity 140 such that an interface 172 of liquid 170 is provided along surface 122 of transparent plate 120. More specifically, interface 172 of liquid 170 is provided along the uneven surface of transparent plate 120 and within recessed areas 126 of surface 122. As described above, recessed areas 126 of surface 122 include angled surfaces 127 oriented at an angle to reflective surfaces 152 of electrodes 150 and surface 124 of transparent plate 120. As such, interface 172 of liquid 170 is oriented at an angle to reflective surfaces 152 of electrodes 150 and oriented at an angle to surface 124 of transparent plate 120.

In one embodiment, liquid 170 is transparent. As such, liquid 170 is clear or colorless in the visible spectrum. In addition, liquid 170 is stable to decomposition in electrical fields, thermally stable with a wide temperature operating range, and photochemically stable. In addition, liquid 170 has a low vapor pressure and a low conductivity, and is non-corrosive. In one embodiment, liquid 170 includes a low permittivity material with flexible molecules that can change conformance in electric fields greater than approximately 10^6 volts per meter. Examples of liquids suitable for use as liquid 170 include siloxanes, silanes, alkyl and perfluoro-alkyl ethers, aromatic ethers, and poly-aromatics, polymers of siloxanes and silanes, liquid crystal, and diazo compounds.

In one embodiment, application of an electrical signal to one or more electrodes 150 produces an electrical field within cavity 140 between a respective electrode 150 provided on surface 112 of substrate 110 and transparent electrode 160 formed within transparent plate 120. In one embodiment, producing an electrical field within cavity 140 changes an index of refraction of liquid 170. By changing the index of refraction of liquid 170, light modulator 100 can be used to vary the direction of light reflected by reflective surface 152 of a respective electrode 150, as described below.

As illustrated in the embodiment of FIG. 1, light modulator 100 modulates light generated by a light source (not shown) located on a side of transparent plate 120 opposite of substrate 110. The light source may include, for example, ambient light and/or artificial light. As such, input light 12, incident on transparent plate 120, passes through transparent plate 120 into cavity 140 and is reflected by reflective surface 152 of a respective electrode 150 as output light 14. Thus, output light 14 is reflected through cavity 140 and transparent plate 120, including through transparent electrode 160.

As output light 14 is reflected through cavity 140, output light 14 passes through liquid 170 and through interface 172 of liquid 170 provided along surface 122 of transparent plate 120. In one embodiment, the index of refraction of liquid 170 and the index of refraction of transparent plate 120 differ. As such, output light 14 refracts at interface 172 of liquid 170.

In one embodiment, for example, liquid 170 contained within cavity 140 of light modulator 100 has an index of refraction greater than one, transparent plate 120 of light modulator 100 has a different index of refraction greater than one, and air which surrounds light modulator 100 has an index of refraction which is substantially one. As such, regions having different indexes of refraction are formed by liquid 170 disposed within cavity 140 of light modulator 100, transparent plate 120 of light modulator 100, and air surrounding light modulator 100.

Because of the different indexes of refraction, a light ray modulated by light modulator 100 undergoes refraction at the different interfaces of air surrounding light modulator 100, transparent plate 120, and liquid 170 contained within cavity 140. For a light ray intersecting a plane surface interface, Snell's Law holds that:

$$n1 \sin(A1) = n2 \sin(A2)$$

where n1 represents the index of refraction on a first side of the plane surface interface, A1 represents the included angle formed on the first side of the plane surface interface between the light ray and a line perpendicular to the plane surface interface through a point where the light ray intersects the plane surface interface, n2 represents the index of refraction on a second side of the plane surface interface, and A2 represents the included angle formed on the second side of the plane surface interface between the light ray and the line perpendicular to the plane surface interface through the point where the light ray intersects the plane surface interface.

In one embodiment, the direction of output light 14 is controlled by the index of refraction of liquid 170. In one embodiment, the index of refraction of liquid 170 is varied by applying an electrical signal to a respective electrode 150 and producing an electrical field within cavity 140. In one embodiment, for example, with an electrical signal applied to a respective electrode 150, the index of refraction of liquid 170 is of a first value and output light 14 is directed in a first direction 14*a*. In one embodiment, however, without an electrical signal applied to a respective electrode 150, the index of refraction of liquid 170 is of a second value and output light 14 is directed in a second direction 14*b*. Thus, light modulator 100 modulates or varies the direction of output light 14 generated by input light 12. As such, light modulator 100 can be used to steer light into and/or away from an optical imaging system.

In one embodiment, directing output light 14 in first direction 14*a* represents an "ON" state of light modulator 100 in that light is directed, for example, to a viewer or onto a display, as described below. In addition, directing output light 14 in second direction 14*b* represents an "OFF" state of light modulator 100 in that light is not directed, for example, to a viewer or onto a display screen.

Figure 2:
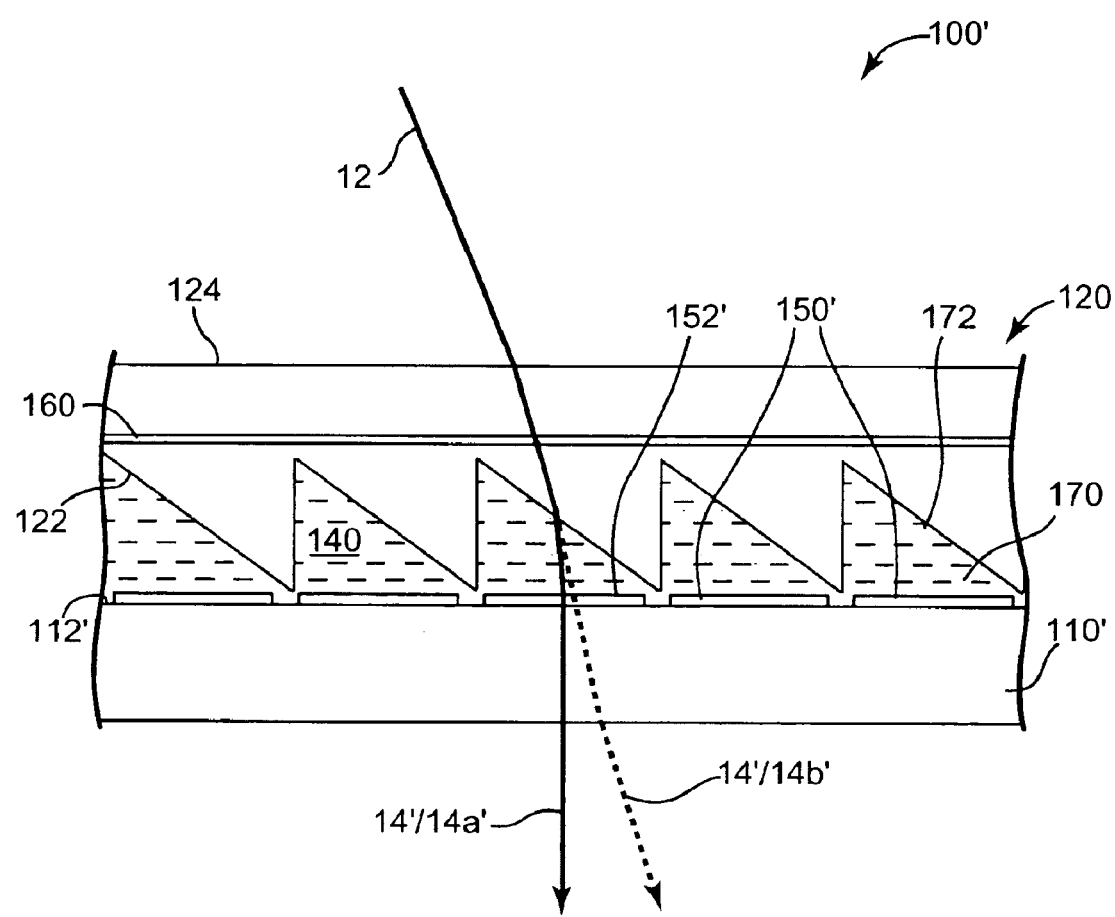
FIG. 2 is a schematic cross-sectional view illustrating another embodiment of the light modulator of FIG. 1.

FIG. 2 illustrates another embodiment of light modulator 100. Similar to light modulator 100, light modulator 100' includes transparent plate 120 and transparent electrode 160 formed within transparent plate 120. Light modulator 100', however, includes a substrate 110' and electrodes 150', each having a surface 152', formed on a surface 112' of substrate 110'. As such, cavity 140 is defined between substrate 110' and transparent plate 120. Similar to light modulator 100, cavity 140 of light modulator 100' is filled with liquid 170.

In one embodiment, substrate 110' is a transparent substrate and electrodes 150' are transparent electrodes. As such, surfaces 152' of electrodes 150' are transparent. In one embodiment, the entire area of each surface 152' is substantially planar. In addition, surface 152' of each electrode 150' is oriented substantially parallel with surface 124 of transparent plate 120. As such, interface 172 of liquid 170 is oriented at an angle to surfaces 152' of electrodes 150' and oriented at an angle to surface 124 of transparent plate 120.

In one embodiment, application of an electrical signal to one or more electrodes 150' produces an electrical field within cavity 140 between a respective electrode 150' provided on surface 112' of substrate 110' and transparent electrode 160 formed within transparent plate 120. In one embodiment, as described above, producing an electrical field within cavity 140 changes an index of refraction of liquid 170. By changing the index of refraction of liquid 170, light modulator 100' can be used to vary the direction of light passing through cavity 140, as described below.

As illustrated in the embodiment of FIG. 2, light modulator 100' modulates light generated by a light source (not shown) located on a side of transparent plate 120 opposite of substrate 110'. As such, input light 12, incident on transparent plate 120, passes through transparent plate 120 and cavity 140. With electrodes 150' being transparent electrodes and substrate 110' being a transparent substrate, input light 12 passes through a respective electrode 150' and substrate 110', and exits as output light 14'.

As input light 12 is directed through cavity 140, input light 12 passes through liquid 170 and through interface 172 of liquid 170 provided along surface 122 of transparent plate 120. In one embodiment, as described above, the index of refraction of liquid 170 and the index of refraction of transparent plate 120 differ. As such, input light 12 refracts at interface 172 of liquid 170.

In one embodiment, as described above, the index of refraction of liquid 170 is varied by applying an electrical signal to a respective electrode 150' and producing an electrical field within cavity 140. In one embodiment, for example, with an electrical signal applied to a respective electrode 150', the index of refraction of liquid 170 is of a first value and output light 14' is directed in a first direction 14a'. In one embodiment, however, without an electrical signal applied to a respective electrode 150', the index of refraction of liquid 170 is of a second value and output light 14' is directed in a second direction 14b'. Thus, light modulator 100' modulates or varies the direction of output light 14' generated by input light 12. As such, light modulator 100' can be used to steer light into and/or away from an optical imaging system.

Figure 3A:
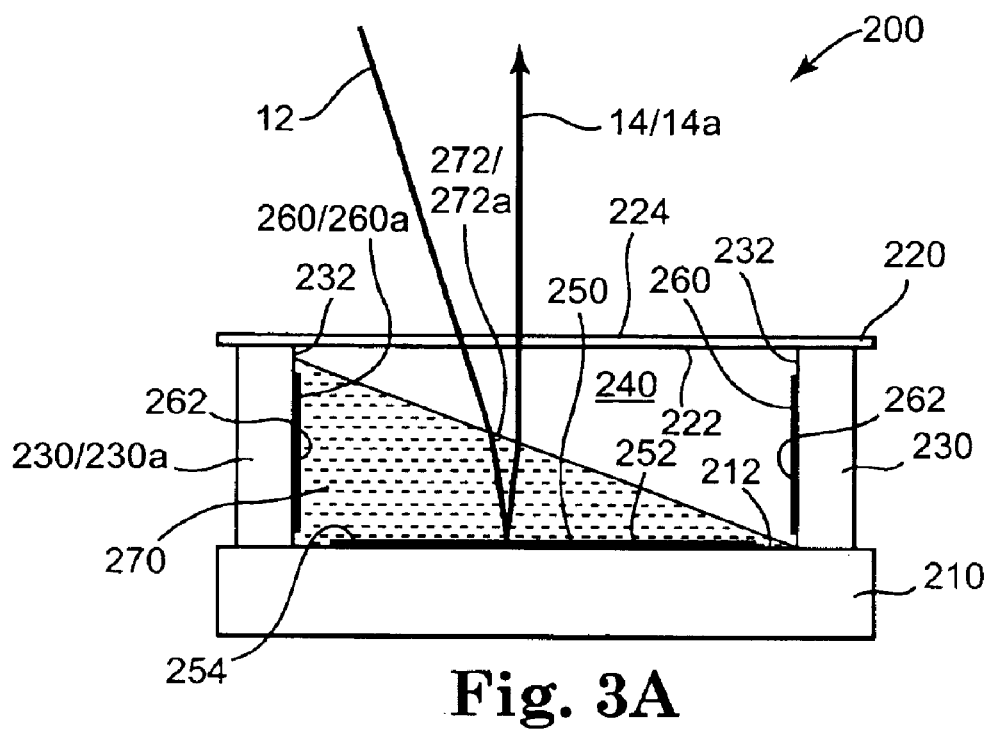
FIGS. 3A and 3B are schematic cross-sectional views illustrating another embodiment of a portion of a light modulator according to the present invention.
Figure 3B:
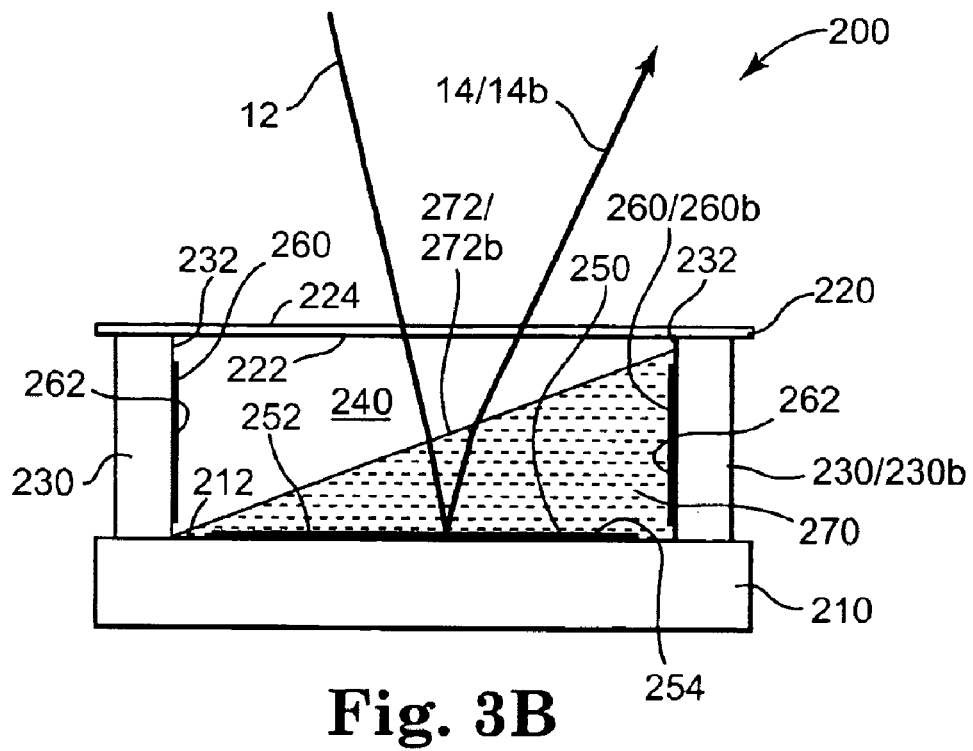

FIGS. 3A and 3B illustrate another embodiment of a light modulator 200. Light modulator 200 also relies on refractive properties of different materials to direct light in different directions. In one embodiment, as described below, a plurality of light modulators 200 are arranged to form an array of light modulators. As such, the array of light modulators may be used to form a display. Thus, the array of light modulators modulate incident light and provide individual cells or pixels of the display. In addition, light modulator 200 may also be used in other imaging systems such as projectors or printers, and may also be used for optical addressing or switching, and/or other optical beam modification.

In one embodiment, light modulator 200 includes a substrate 210, a transparent plate 220, and sidewalls 230 extended between substrate 210 and transparent plate 220. In one embodiment, transparent plate 220 is oriented substantially parallel with substrate 210 and spaced from substrate 210 so as to define a cavity 240 therebetween. Substrate 210 has a surface 212 adjacent cavity 240 and sidewalls 230 have surfaces 232 adjacent cavity 240. In addition, transparent plate 220 has a surface 222 adjacent cavity 240 and a surface 224 opposite surface 222. In one embodiment, surface 212 of substrate 210 and surfaces 222 and 224 of transparent plate 220 are substantially planar and oriented substantially parallel with each other.

In one embodiment, substrate 210 is a silicon substrate and includes circuitry for light modulator 200. In one embodiment, transparent plate 220 is a glass plate. Other suitable substantially planar translucent or transparent materials, however, may be used. Examples of such materials includes quartz and plastic.

In one embodiment, an electrode 250 is formed on surface 212 of substrate 210 and electrodes 260 are formed on surfaces 232 of sidewalls 230. In one embodiment, electrode 250 has a reflective surface 252 adjacent cavity 240. In one embodiment, the entire area of reflective surface 252 is substantially planar. In addition, reflective surface 252 of electrode 250 is oriented substantially parallel with surfaces 222 and 224 of transparent plate 240. As such, electrode 250 reflects light through cavity 240 and transparent plate 220, as described below.

In one embodiment, cavity 240 is partially filled with a liquid 270. Liquid 270 is disposed within cavity 240 such that an interface 272 of liquid 270 is provided within cavity 240. In one embodiment, as described below, interface 272 of liquid 270 is oriented at an angle to reflective surface 252 of electrode 250 and oriented at an angle to surfaces 222 and 224 of transparent plate 220.

In one embodiment, liquid 270 is transparent. As such, liquid 270 is clear or colorless in the visible spectrum. In addition, liquid 270 is stable to decomposition in electrical fields, thermally stable with a wide temperature operating range, and photochemically stable. In addition, liquid 270 has a low vapor pressure, low dielectric constant, and low conductivity, and is noncorrosive. In addition, liquid 270 is non-polar and hydrophobic. Examples of liquids suitable for use as liquid 270 include siloxanes, silanes, alkyl and perfluoro-alkyl ethers, aromatic ethers, aromatics, substituted aromatics, and poly-aromatics, polymers of siloxanes and silanes, liquid crystal, and diazo compounds.

In one embodiment, application of an electrical signal to a respective electrode 260 provided along a respective sidewall 230 produces an electrical field within cavity 240 between the respective electrode 260 and electrode 250 provided along surface 212 of substrate 210. In one embodiment, producing an electrical field within cavity 240 polarizes liquid 270 such that liquid 270 moves toward the respective electrode 260. As such, interface 272 of liquid 270 within cavity 240 changes. Thus, an angle of interface 272 of liquid 270 within cavity 240 also changes. Accordingly, by changing the angle of interface 272 of liquid 270, light modulator 200 can be used to vary the direction of light reflected by reflective surface 252 of electrode 250, as described below.

In one embodiment, a hydrophobic coating 254 is provided over electrode 250 formed on substrate 210 and a hydrophobic coating 262 is provided over electrodes 260 formed on sidewalls 230. In addition, in one embodiment, liquid 270 is a hydrophobic liquid. As such, without the application of an electrical signal to a respective electrode 260, liquid 270 within cavity 240 spreads evenly across electrode 250 and surface 212 of substrate 210 due to surface and capillary forces. However, when an electrical signal is applied to a respective electrode 260, liquid 270 becomes polarized and, in one embodiment, becomes hydrophilic. As such, liquid 270 moves toward and wets the respective electrode 260.

In one embodiment, hydrophobic coating 254 is also provided over surface 212 of substrate 210 adjacent electrode 250 and hydrophobic coating 262 is also provided over surfaces 232 of sidewalls 230 adjacent electrodes 260. When there is no electrical field within cavity 240, the hydrophobic coating helps to keep liquid 270 in place (by Van der Waals and capillary forces). However, when an electrical field is created within cavity 240, for example, by activation of a respective electrode 260, liquid 270 next to the respective electrode 260 and the hydrophobic coating provided on the respective electrode 260 are both polarized and become hydrophilic. The other unactivated electrode, however, remains hydrophobic and, therefore, repels the now polarized, hydrophilic liquid. Thus, the hydrophobic coating on the unactivated electrode helps to move liquid 270 more quickly towards the activated electrode. As such, the hydrophobic coating within cavity 240 contributes to "electrowetting" as the mechanism for polarizing liquid 270 of light modulator 200.

As illustrated in the embodiments of FIGS. 3A and 3B, light modulator 200 modulates light generated by a light source (not shown) located on a side of transparent plate 220 opposite of substrate 210. The light source may include, for example, ambient light and/or artificial light. As such, input light 12, incident on transparent plate 220, passes through transparent plate 220 into cavity 240 and is reflected by reflective surface 252 of electrode 250 as output light 14. Thus, output light 14 is reflected through cavity 240 and transparent plate 220.

As output light 14 is reflected through cavity 240, output light 14 passes through liquid 270 and through interface 272 of liquid 270. In one embodiment, the index of refraction of liquid 270 and the index of refraction within cavity 240 surrounding liquid 270 differ. As such, output light 14 refracts at interface 272 of liquid 270.

In one embodiment, for example, liquid 270 contained within cavity 240 of light modulator 200 has an index of refraction greater than one, and air surrounding liquid 270 within cavity 240 has an index of refraction which is substantially one. In addition, air surrounding light modulator 200 has an index of refraction which is substantially one. As such, regions having different indexes of refraction are formed by liquid 270 within cavity 240 and air surrounding liquid 270 within cavity 240 and surrounding light modulator 200. Because of the different indexes of refraction, a light ray modulated by light modulator 200 undergoes refraction at interface 272 of liquid 270.

In one illustrative embodiment, the index of refraction of liquid 270 is approximately 1.4 and the index of refraction of air surrounding liquid 270 within cavity 240 and surrounding light modulator 200 is substantially one. In one embodiment, a material of transparent plate 220 is selected so as to have an index of refraction substantially equal to one. In addition, a thickness of transparent plate 220 is substantially thin such that refraction at transparent plate 220 is negligible.

In one embodiment, the direction of output light 14 is controlled by interface 272 of liquid 270. In one embodiment, an angle of interface 272 of liquid 270 is varied by applying an electrical signal to a respective electrode 260 and producing an electrical field within cavity 240, as described above. For example, as illustrated in the embodiment of FIG. 3A, with an electrical signal applied to a first electrode 260a, liquid 270 moves toward a respective sidewall 230a and establishes interface 272a of liquid 270. As such, output light 14 is directed in a first direction 14a. However, as illustrated in the embodiment of FIG. 3B, with an electrical signal applied to a second electrode 260b, liquid 270 moves toward a respective sidewall 230b and establishes an interface 272b of liquid 270. As such, output light 14 is directed in a second direction 14b. Thus, light modulator 200 modulates or varies the direction of output light 14 generated by input light 12. Light modulator 200, therefore, can be used to steer light into and/or away from an optical imaging system.

In one embodiment, directing output light 14 in first direction 14a represents an "ON" state of light modulator 200 in that light is directed, for example, to a viewer or onto a display screen, as described below. In addition, directing output light 14 in second direction 14b represents an "OFF" state of light modulator 200 in that light is not directed, for example, to a viewer or onto a display screen.

In one embodiment, each light modulator 200 forms one cell or pixel. As such, in one exemplary embodiment, the area of surface 212 of substrate 210 within cavity 240 is approximately 5 microns by approximately 5 microns and the spacing between substrate 210 and transparent plate 220 is approximately 1.5 microns or greater. In another exemplary embodiment, the area of surface 212 of substrate 210 within cavity 240 is approximately 10 microns by approximately 10 microns and the spacing between substrate 210 and transparent plate 220 is approximately 3 microns, and in another exemplary embodiment, the area of surface 212 of substrate 210 within cavity 240 is approximately 20 microns by approximately 20 microns and the spacing between substrate 210 and transparent plate 220' is approximately 6 microns.

Figure 4A:
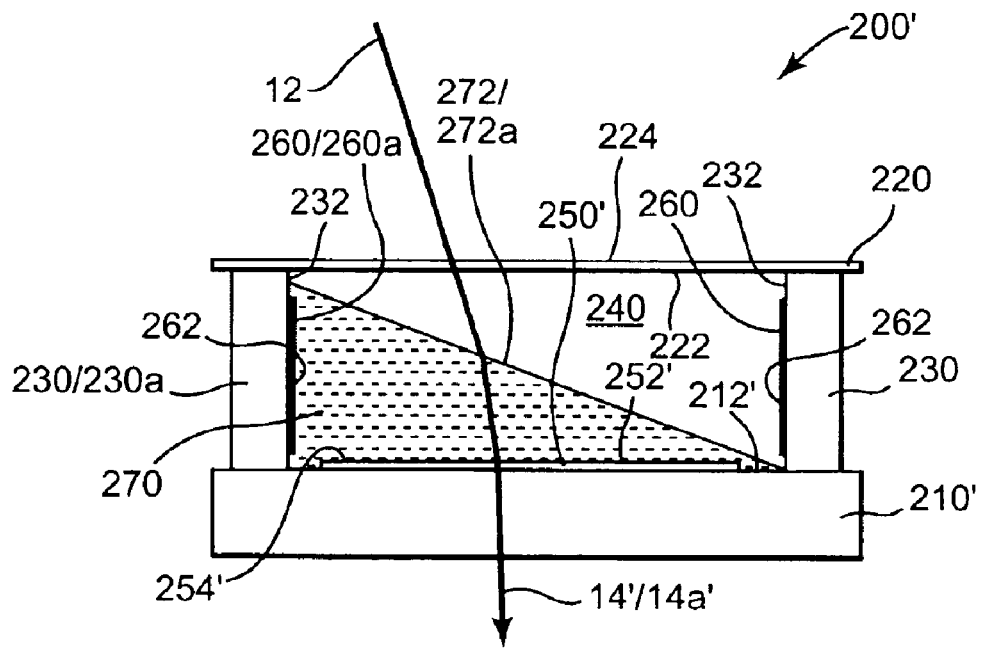
FIGS. 4A and 4B are schematic cross-sectional views illustrating another embodiment of the light modulator of FIGS. 3A and 3B.
Figure 4B:
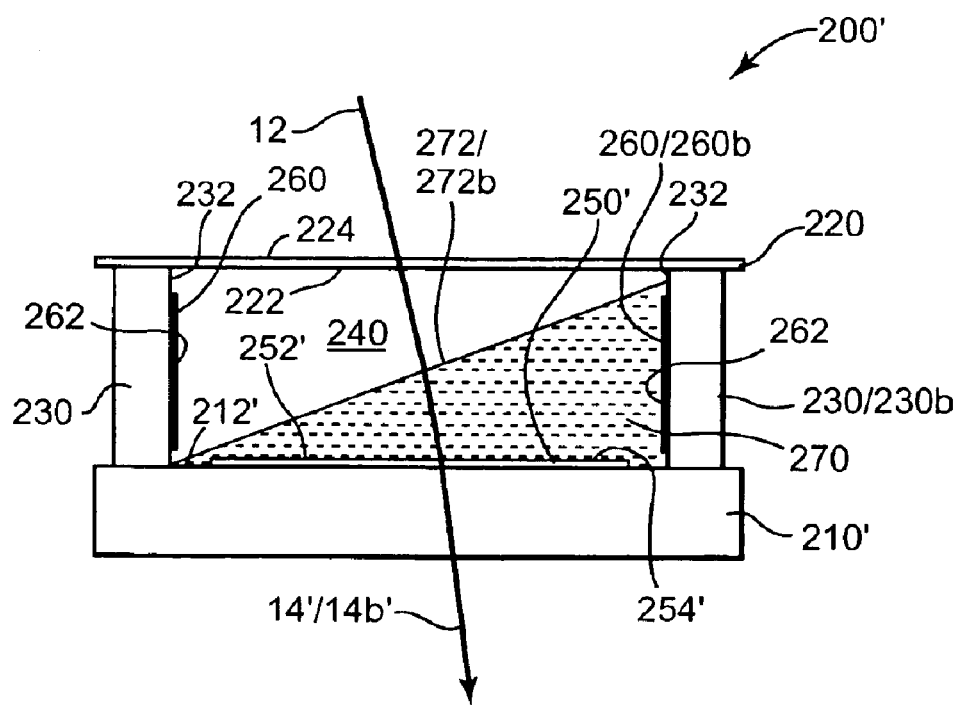

FIGS. 4A and 4B illustrate another embodiment of light modulator 200. Similar to light modulator 200, light modulator 200' includes transparent plate 220 and sidewalls 230 with electrodes 260 formed on surfaces 232 of sidewalls 230. Light modulator 200', however, includes a substrate 210' and an electrode 250', having a surface 252', formed on a surface 212' of substrate 210'. As such, cavity 240 is defined between substrate 210' and transparent plate 220. Similar to light modulator 200, cavity 240 of light modulator 200' is partially filled with liquid 270. In one embodiment, a hydrophobic coating 254' is provided over electrode 250' formed on substrate 210' and hydrophobic coating 262 is provided over electrodes 260 formed on sidewalls 230. In addition, in one embodiment, liquid 270 is a hydrophobic liquid.

In one embodiment, substrate 210' is a transparent substrate and electrode 250' is a transparent electrode. As such, surface 252' of electrode 250' is transparent. In one embodiment, the entire area of surface 252' is substantially planar. In addition, surface 152' of electrode 150' is oriented substantially parallel with surfaces 222 and 224 of transparent plate 220. As such, interface 272 of liquid 270 is oriented at an angle to surface 252' of electrode 250' and oriented at an angle to surfaces 222 and 224 of transparent plate 220.

In one embodiment, application of an electrical signal to a respective electrode 260 provided along a respective sidewall 230 produces an electrical field within cavity 240 between the respective electrode 260 and electrode 250' provided along surface 212' of substrate 210'. In one embodiment, as described above, producing an electrical field within cavity 240 polarizes liquid 270 such that liquid 270 moves toward the respective electrode 260. As such, interface 272 of liquid 270 within cavity 240 changes. Thus, an angle of interface 272 of liquid 270 within cavity 240 also changes. Accordingly, by changing the angle of interface 272 of liquid 270, light modulator 200' can be used to vary the direction of light passing through cavity 240, as described below.

As illustrated in the embodiments of FIGS. 4A and 4B, light modulator 200' modulates light generated by a light source (not shown) located on a side of transparent plate 220 opposite of substrate 210'. As such, input light 12, incident on transparent plate 220, passes through transparent plate 220 and cavity 240. With electrode 250' being a transparent electrode and substrate 210' being a transparent substrate, input light 12 passes through electrode 250' and substrate 210', and exits as output light 14'.

As input light 12 is directed through cavity 240, input light 12 passes through liquid 270 and through interface 272 of liquid 270. In one embodiment, as described above, the index of refraction of liquid 270 and the index of refraction within cavity 240 surrounding liquid 270 differ. As such, input light 12 refracts at interface 272 of liquid 270.

In one embodiment, as described above, the direction of output light 14' is controlled by interface 272 of liquid 270. In one embodiment, an angle of interface 272 of liquid 270 is varied by applying an electrical signal to a respective electrode 260 and producing an electrical field within cavity 240. For example, as illustrated in the embodiment of FIG. 4A, with an electrical signal applied to a first electrode 260a, liquid 270 moves toward a respective sidewall 230a and establishes interface 272a of liquid 270. As such, output light 14' is directed in a first direction 14a'. However, as illustrated in the embodiment of FIG. 4B, with an electrical signal applied to a second electrode 260b, liquid 270 moves toward a respective sidewall 230b and establishes an interface 272b of liquid 270. As such, output light 14' is directed in a second direction 14b'. Thus, light modulator 200' modulates or varies the direction of output light 14' generated by input light 12. Light modulator 200', therefore, can be used to steer light into and/or away from an optical imaging system.

Figure 5:
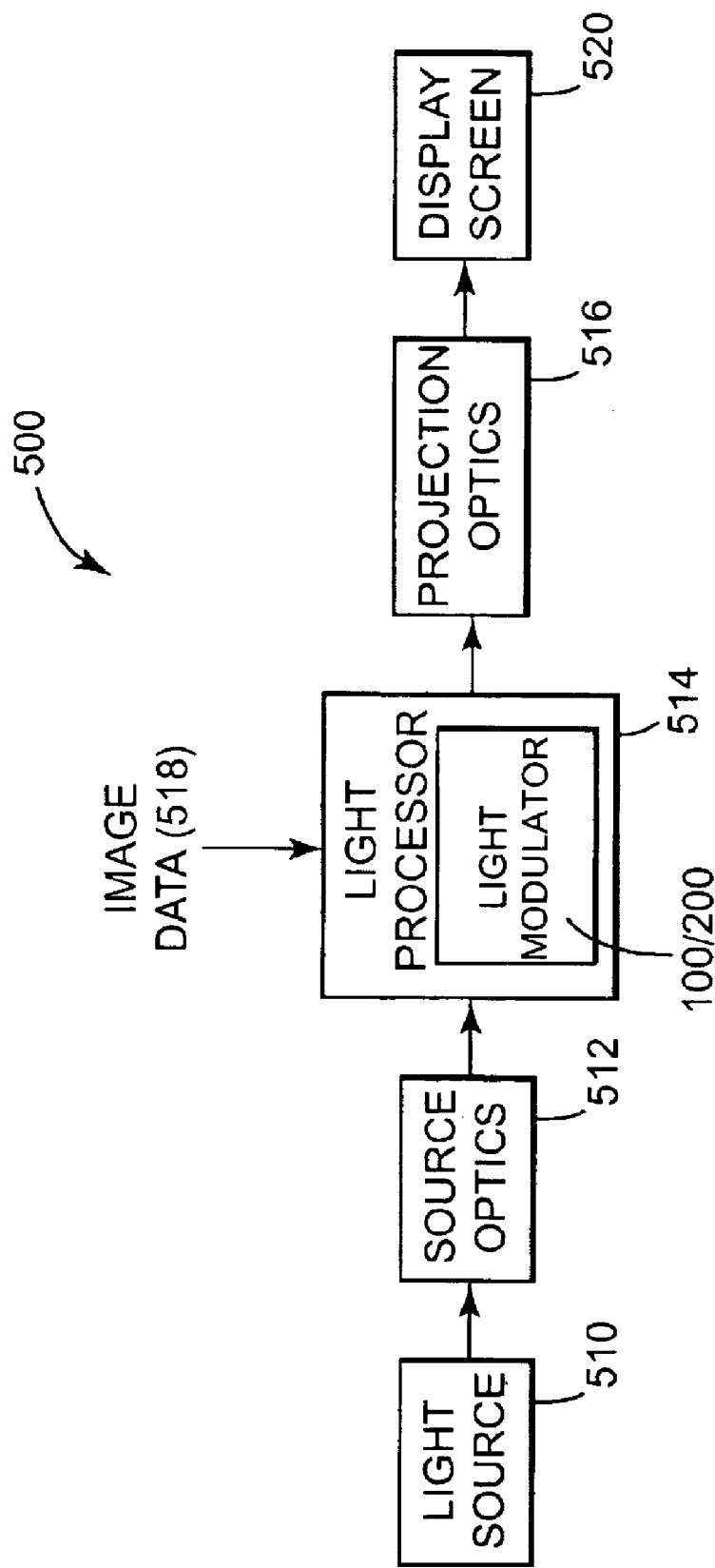
FIG. 5 is a block diagram illustrating one embodiment of a display system including a light modulator according to the present invention.

In one embodiment, as illustrated in FIG. 5, light modulator 100 (including light modulator 100') or light modulator 200 (including light modulator 200') is incorporated in a display system 500. Display system 500 includes a light source 510, source optics 512, a light processor or controller 514, and projection optics 516. Light processor 514 includes multiple light modulators 100 or 200 arranged in an array such that each reflective electrode 150 or 250 constitutes one cell or pixel of the display. In one embodiment, the array of light modulators 100 or 200 may be formed on a common substrate with separate cavities and/or a common cavity for the reflective electrodes of the multiple light modulators. As such, each cavity may represent one cell or pixel and/or multiple cavities may form one cell or pixel.

In one embodiment, light processor 514 receives image data 518 representing an image to be displayed. As such, light processor 514 controls energization of light modulators 100 or 200 and the modulation of light received from light source 510 based on image data 518. The modulated light is then projected to a viewer or onto a display screen 520.

Figure 6:
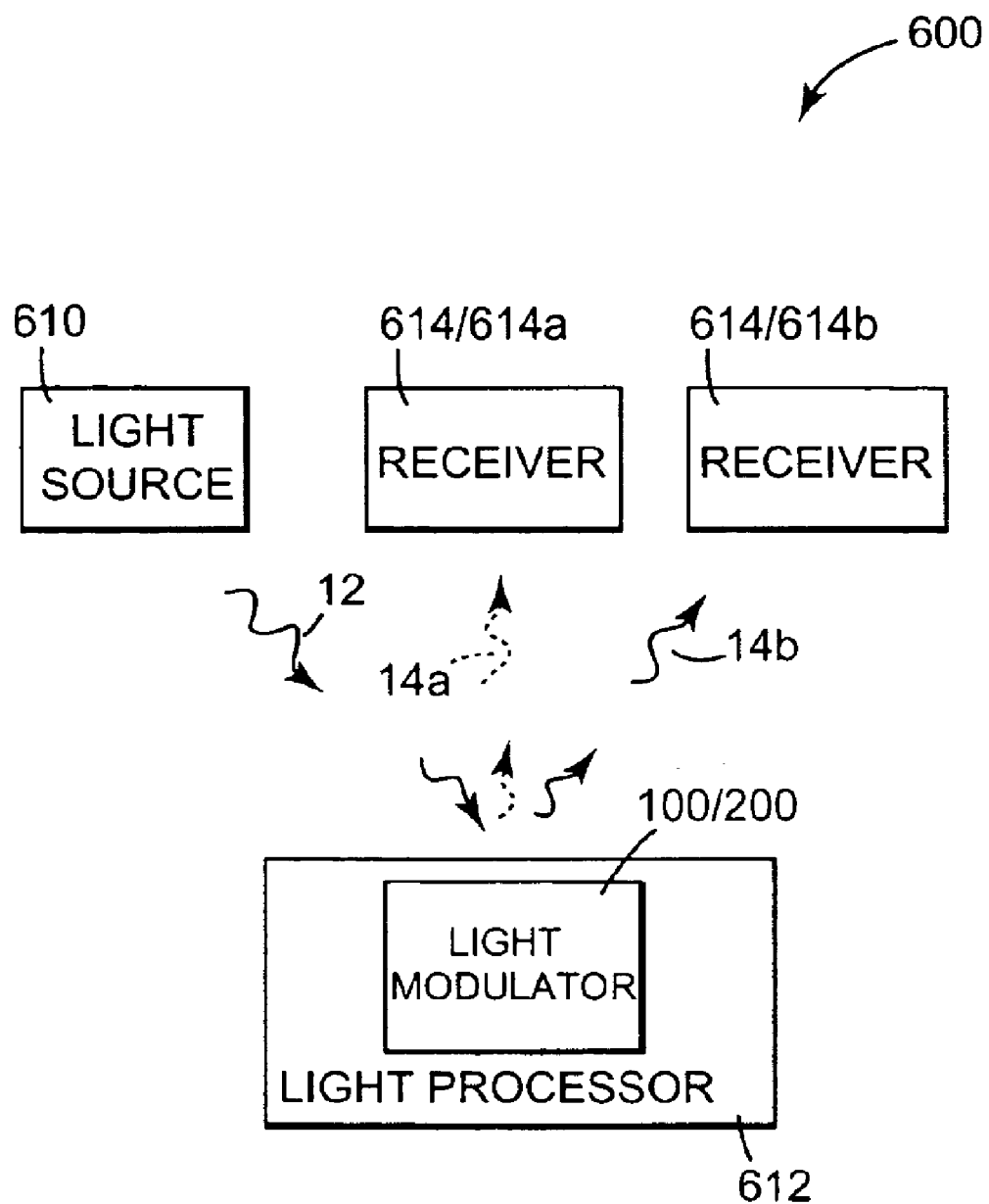
FIG. 6 is a block diagram illustrating one embodiment of an optical switch including a light modulator according to the present invention.

In one embodiment, as illustrated in FIG. 6, light modulator 100 (including light modulator 100') or light modulator 200 (including light modulator 200') is incorporated in an optical switching system 600. Optical switching system 600 includes a light source 610, a light processor or controller 612, and at least one receiver 614. Light processor 612 includes one or more light modulators 100 or 200 configured to selectively direct light to receiver 614. Light source 610 may include, for example, an optical fiber, laser, light emitting diode (LED), or other light emitting device for producing input light 12. Receiver 614 may include, for example, an optical fiber, light pipe/channel, or other optical receiving or detecting device.

In one embodiment, receiver 614 includes a first receiver 614a and a second receiver 614b. As such, light processor 612 controls energization of light modulator 100 or 200 and the modulation of light received from light source 610 to direct light to first receiver 614a or second receiver 614b. For example, when an electrical signal is applied to an electrode 150 of light modulator 100, output light 14a is directed to first receiver 614a and, when an electrical signal is not applied to electrode 150 of light modulator 100, output light 14b is directed to second receiver 614b. In addition, when an electrical signal is applied to side electrode 260a of light modulator 200, output light 14a is directed to first receiver 614a and, when an electrical signal is applied to side electrode 260b of light modulator 200, output light 14b is directed to second receiver 614b. As such, optical switching system 600 controls or directs light with light modulator 100 or 200 for use, for example, in optical addressing or switching.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A light modulator, comprising:

a substrate;

a transparent plate spaced from the substrate, the transparent plate and the substrate defining a cavity therebetween;

a plurality of electrodes formed on the substrate adjacent the cavity; and a liquid having an index of refraction greater than one disposed within the cavity, wherein an interface of the liquid is oriented at an angle to a surface of at least one of the electrodes and oriented at an angle to a surface of the transparent plate, wherein light is adapted to pass through and refract at the interface of the liquid, and wherein the transparent plate has an uneven surface including a plurality of recessed areas, wherein the interface of the liquid is provided along the uneven surface within the recessed areas, wherein each of the electrodes is associated with one of the recessed areas of the uneven surface.

2. The light modulator of claim 1, wherein the surface of the at least one of the electrodes is substantially planar over an entirety thereof.

3. The light modulator of claim 1, wherein the surface of the at least one of the electrodes is oriented substantially parallel with the surface of the transparent plate.

4. The light modulator of claim 1, wherein the index of refraction of the liquid is adapted to change when an electrical signal is applied to at least one of the electrodes.

5. The light modulator of claim 1, further comprising:

a transparent electrode formed within the transparent plate.

6. A light modulator, comprising:

a substrate;

a transparent plate spaced from the substrate, the transparent plate and the substrate defining a cavity therebetween:

at least one electrode formed on the substrate adjacent the cavity;

a sidewall extended between the substrate and the transparent plate;

an additional electrode formed on the sidewall adjacent the cavity; and a liquid having an index of refraction greater than one disposed within the cavity, wherein an interface of the liquid is oriented at an angle to a surface of the at least one electrode and oriented at an angle to a surface of the transparent plate, wherein light is adapted to pass through and refract at the interface or the liquid.

7. The light modulator of claim 6, wherein the liquid is adapted to move toward the additional electrode and establish the interface of the liquid at the angle to the surface of the at least one electrode when an electrical signal is applied to the additional electrode.

8. The light modulator of claim 6, further comprising:
a hydrophobic coating formed over the at least one electrode formed on the substrate and the additional electrode formed on the sidewall.

9. The light modulator of claim 8, wherein the liquid is adapted to change between a hydrophobic liquid and a hydrophilic liquid when an electrical signal is applied to the additional electrode.

10. The light modulator of claim 1, wherein the surface of the at least one of the electrodes is a reflective surface, wherein the reflective surface is adapted to reflect the light through the liquid, through the interface of the liquid, and through the surface of the transparent plate.

11. The light modulator of claim 1, wherein the substrate is a transparent substrate and at least one of the electrodes is a transparent electrode, wherein the light is adapted to pass through the transparent electrode and the transparent substrate.

12. A display device including the light modulator of claim 1.

13. An optical switch including the light modulator of claim 1.

14. A method of forming a light modulator, the method comprising:
forming a transparent plate with an uneven surface including a plurality of recessed areas;
spacing the transparent plate from a substrate, including defining a cavity between the transparent plate and the substrate;
forming a plurality of electrodes on the substrate adjacent the cavity, including associating each of the electrodes with one of the recessed areas of the uneven surface; and
disposing a liquid having an index of refraction greater than one within the cavity, including orienting an interface of the liquid at an angle to a surface of at least one of the electrodes and at an angle to a surface of the transparent plate, wherein the interface of the liquid is provided along the uneven surface of the transparent plate within the recessed areas,
wherein light is adapted to pass through and refract at the interface of the liquid.

15. The method of claim 14, wherein the surface of the at least one of the electrodes is substantially planar over an entirety thereof.

16. The method of claim 14, wherein forming the plurality of electrodes includes orienting the surface of the at least one of the electrodes substantially parallel with the surface of the transparent plate.

17. The method of claim 14, wherein the index of refraction of the liquid is adapted to change when an electrical signal is applied to at least one of the electrodes.

18. The method of claim 14, further comprising:
forming a transparent electrode within the transparent plate.

19. A method of forming a light modulator, the method comprising:

spacing a transparent plate from a substrate including defining a cavity between the transparent plate and the substrate;
forming at least one electrode on the substrate adjacent the cavity;
extending a sidewall between the substrate and the transparent plate;
forming an additional electrode on the sidewalls and
disposing a liquid having an index of refraction greater than one within the cavity, including orienting an interface of the liquid at an angle to a surface of the at least one electrode and at an angle to a surface of the transparent plate,
wherein light is adapted to pass through and refract at the interface of the liquid.

20. The method of claim 19, wherein the liquid is adapted to move toward the additional electrode and establish the interface of the liquid at the angle to the surface of the at least one electrode when an electrical signal is applied to the additional electrode.

21. The method of claim 19, further comprising:
forming a hydrophobic coating over the at least one electrode formed on the substrate and the additional electrode formed on the sidewall.

22. The method of claim 21, wherein the liquid is adapted to change between a hydrophobic liquid and a hydrophilic liquid when an electrical signal is applied to the additional electrode.

23. The method of claim 14, wherein forming the plurality of electrodes includes forming the surface of the at least one of the electrodes as a reflective surface, wherein the reflective surface is adapted to reflect the light through the liquid, through the interface of the liquid, and through the surface of the transparent plate.

24. The method of claim 14, wherein the substrate is a transparent substrate, and wherein forming the plurality of electrodes includes forming at least one of the electrodes as a transparent electrode, wherein the light is adapted to pass through the transparent electrode and the transparent substrate.

25. A light modulator, comprising:
a substrate;
a transparent plate spaced from the substrate, the transparent plate and the substrate defining a cavity therebetween;
a plurality of electrodes formed on the substrate adjacent the cavity;
a liquid having an index of refraction greater than one disposed within the cavity; and
means for orienting an interface of the liquid at an angle to a surface of at least one of the electrodes and at an angle to a surface of the transparent plate, wherein light is adapted to pass through and refract at the interface of the liquid,
wherein means for orienting the interface of the liquid includes an uneven surface of the transparent plate, the uneven surface including a plurality of recessed areas and the interface of the liquid being provided along the uneven surface within the recessed areas, wherein each of the electrodes is associated with one of the recessed areas of the uneven surface.

26. The light modulator of claim 25, wherein the surface of the at least one of the electrodes is substantially planar over an entirety thereof.

27. The light modulator of claim 25, wherein the surface of the at least one of the electrodes is oriented substantially parallel to the surface of the transparent plate.

28. The light modulator of claim 25, wherein the index of refraction of the liquid is adapted to change when an electrical signal is applied to at least one of the electrodes.

29. The light modulator of claim 25, further comprising:
a transparent electrode formed within the transparent plate.

30. A light modulator, comprising:
a substrate;
a transparent plate spaced from the substrate, the transparent plate and the substrate defining a cavity therebetween:
a sidewall extended between the substrate and the transparent plate;
at least one electrode formed on the substrate adjacent the cavity:
a liquid having an index of refraction greater than one disposed within the cavity; and
means for orienting an interface of the liquid at an angle to a surface of the at least one electrode and at an angle to a surface of the transparent plate, wherein light is adapted to pass through and refract at the interface of the liquid,
wherein means for orienting the interface of the liquid includes an additional electrode formed on the sidewall, wherein the liquid is adapted to move toward the additional electrode and establish the interface of the liquid at the angle to the surface of the at least one electrode when an electrical signal is applied to the additional electrode.

31. The light modulator of claim 30, wherein means for orienting the interface of the liquid further includes a hydrophobic coating formed over the at least one electrode formed on the substrate and the additional electrode formed on the sidewall, and
wherein the liquid is adapted to change between a hydrophobic liquid and a hydrophilic liquid when an electrical signal is applied to the additional electrode.

32. The light modulator of claim 25, wherein the surface of the at least one of the electrodes is a reflective surface, wherein the reflective surface is adapted to reflect the light through the liquid, through the interface of the liquid, and through the surface of the transparent plate.

33. The light modulator of claim 25, wherein the substrate is a transparent substrate and at least one of the electrodes is a transparent electrode, wherein the light is adapted to pass through the transparent electrode and the transparent substrate.

34. A method of controlling light with a light modulator including a plurality of electrodes formed on a substrate, the method comprising:
directing light through a transparent plate spaced from the substrate and through a cavity defined between the transparent plate and the substrate, including directing the light toward an uneven surface of the transparent plate including a plurality of recessed areas, wherein each of the electrodes is associated with one of the recessed areas of the uneven surface; and
directing the light through a liquid having an index of refraction greater than one disposed within the cavity, including passing the light through and refracting the light at an interface of the liquid, wherein the interface of the liquid is oriented at an angle to a surface of at least one of the electrodes and oriented at an angle to a surface of the transparent plate, wherein the interface of the liquid is provided along the uneven surface of the transparent plate within the recessed areas.

35. The method of claim 34, wherein the surface of the at least one of the electrodes is substantially planar over an entirety thereof.

36. The method of claim 35, wherein the surface of the at least one of the electrodes is oriented substantially parallel to the surface of the transparent plate.

37. The method of claim 35, further comprising:
applying an electrical signal to at least one of the electrodes and changing the index of refraction of the liquid.

38. The method of claim 34, wherein directing the light through the transparent plate includes directing the light through a transparent electrode formed within the transparent plate.

39. A method of controlling light with a light modulator including at least one electrode formed on a substrate, the method comprising:
directing light through a transparent plate spaced from the substrate and through a cavity defined between the transparent plate and the substrate;
directing the light through a liquid having an index of refraction greater than one disposed within the cavity, including passing the light through and refracting the light at an interface of the liquid, wherein the interface of the liquid is oriented at an angle to a surface of the at least one electrode and oriented at an angle to a surface of the transparent plate; and
applying an electrical signal to an additional electrode of the light modulator, including moving the liquid toward the additional electrode and establishing the interface of the liquid at the angle to the surface of the at least one electrode.

40. The method of claim 39, wherein the at least one electrode and the additional electrode each have a hydrophobic coating formed thereover.

41. The method of claim 40, wherein applying the electrical signal to the additional electrode includes changing the liquid between a hydrophobic liquid and a hydrophilic liquid.

42. The method of claim 34, wherein the surface of the at least one of the electrodes is a reflective surface, and further comprising:
reflecting the light with the reflective surface of the at least one of the electrodes, including directing the light through the liquid, through the interface of the liquid, and through the surface of the transparent plate.

43. The method of claim 34, wherein at least one of the electrodes is a transparent electrode and the substrate is a transparent substrate, and further comprising:
directing the light through the transparent electrode and the transparent substrate.

44. The light modulator of claim 6, wherein the surface of the at least one electrode is a reflective surface, wherein the reflective surface is adapted to reflect the light through the liquid, through the interface of the liquid, and through the surface of the transparent plate.

45. The light modulator of claim 6, wherein the substrate is a transparent substrate and the at least one electrode is a transparent electrode, wherein the light is adapted to pass through the transparent electrode and the transparent substrate.

46. A display device including the light modulator of claim 6.

47. An optical switch including the light modulator of claim 6.

48. The method of claim 19, wherein forming the at least one electrode includes forming the surface of the at least one electrode as a reflective surface, wherein the reflective surface is adapted to reflect the light through the liquid, through the interface of the liquid, and through the surface of the transparent plate.

49. The method of claim 19, wherein the substrate is a transparent substrate, and wherein forming the at least one electrode includes forming the at least one electrode as a transparent electrode, wherein the light is adapted to pass through the transparent electrode and the transparent substrate.

50. The light modulator of claim 30, wherein the surface of the at least one electrode is a reflective surface, wherein the reflective surface is adapted to reflect the light through the liquid, through the interface of the liquid, and through the surface of the transparent plate.

51. The light modulator of claim 30, wherein the substrate is a transparent substrate and the at least one electrode is a transparent electrode, wherein the light is adapted to pass through the transparent electrode and the transparent substrate.

52. The method of claim 39, wherein the surface of the at least one electrode is a reflective surface, and further comprising:
    reflecting the light with the reflective surface of the at least one electrode, including directing the light through the liquid, through the interface of the liquid, and through the surface of the transparent plate.

53. The method of claim 39, wherein the at least one electrode is a transparent electrode and the substrate is a transparent substrate, and further comprising:
    directing the light through the transparent electrode and the transparent substrate.

* * * * *